United States Patent
Amatsutsu

[19]

[11] Patent Number: 6,007,110
[45] Date of Patent: Dec. 28, 1999

[54] BELL MOUTH FOR ANNULARLY CORRUGATED PIPE

[75] Inventor: Hiroyuki Amatsutsu, Osaka, Japan

[73] Assignee: Totaku Industries, Inc., Osaka, Japan

[21] Appl. No.: 09/115,825

[22] Filed: Jul. 15, 1998

[30] Foreign Application Priority Data

Jul. 15, 1997 [JP] Japan ..................... 9-207076

[51] Int. Cl.⁶ ............................................. F16L 33/00
[52] U.S. Cl. ............................................. 285/239; 285/903
[58] Field of Search ........................... 285/239, 401, 285/423, 903, 921; 174/65 R, 74 R, 75 R, 82, 93, 68.1

[56] References Cited

U.S. PATENT DOCUMENTS

| | | | |
|---|---|---|---|
| 4,082,327 | 4/1978 | Sting et al. | 285/903 |
| 4,247,136 | 1/1981 | Fouss et al. | 285/903 |
| 4,286,808 | 9/1981 | Fouss et al. | 285/903 |
| 4,457,544 | 7/1984 | Snow et al. | 285/903 |
| 4,480,855 | 11/1984 | Rosenbaum | 285/903 |
| 5,346,264 | 9/1994 | Law et al. | 285/903 |

*Primary Examiner*—Eric K. Nicholson
*Attorney, Agent, or Firm*—Whitham, Curtis & Whitham

[57] ABSTRACT

A tubular portion 1 of a bell mouth has on its outer peripheral surface one or a plurality of first projections 21 projecting radially and one or a plurality of second projections 22 projecting at a position phased differently from the first projection 21 in an axial direction and in a circumferential direction, each of the projections 21 and 22 being formed such that its surface on a bell-shaped opening portion 3 side is formed as a sharply angled surface 2a, while its surface on a tubular opening portion 4 side is formed as a gently inclined surface 2b, an axial phase interval w between the first projection 21 and the second projection 22 is set to satisfy the relationship: w≦W with respect to an axial width W of an inner surface portion of a small-diameter portion 32 in the annularly corrugated pipe P, a circumferential phase angle r being substantially equal to a value calculated by dividing a half angle of circumference (180 degrees) by the first projections 21.

7 Claims, 12 Drawing Sheets

BELL MOUTH FOR ANNULARLY CORRUGATED PIPE

BACKGROUND OF THE INVENTION

The present invention relates to a bell mouth which is used by being attached to an opening portion of a pipe used by being connected to a handhole or a manhole which is used as a junction point for electric cables or telephone cables to form an underground conduit line in buried form.

Conventionally, a member which is generally referred to as a bell mouth and whose one end is formed into a tapered tubular form is inserted and fitted in an opening portion of a pipe for forming a conduit line by being connected to a pipe connecting hole in a junction point of this type for electric cables, telephone cables, or the like, e.g., a handhole or a manhole (hereafter, such a junction point will be representatively referred to as the "handhole" or the "handhole or the like"). This member, that is, the bell mouth is used as a compensating means for protecting the pipe opening portion and for smoothly guiding electric cables at the time of insertion of the electric cables into the conduit line.

However, generally, the pipe which is conventionally used by being connected to the handhole or the like is a spirally corrugated pipe, and the bell mouth which is used by being coupled to the opening portion of the spirally corrugated pipe has been known and used for a long time. As for this bell mouth, its spirally corrugated portion which is threadedly engaged with the spirally corrugated portion of the pipe is formed as a tubular portion, and this spirally corrugated portion is inserted into the spiral pipe along the spiral of the pipe while spirally rotating the bell mouth, so as to be inserted and fixed in the opening portion of the pipe.

In the case where the pipe is the spirally corrugated pipe as described above, the bell mouth is structured such that it is also provided with the spirally corrugated portion which is threadedly engaged with the spirally corrugated portion of the pipe, so that the bell mouth can be coupled firmly to the pipe by being screwed in so as not to come off the pipe.

However, in a case where the pipe is not the spirally corrugated pipe but an annularly corrugated pipe, since the bell mouth cannot be screwed into the pipe, it is difficult to firmly couple the bell mouth to the pipe so as not to come off the pipe. For this reason, such a coupling method has not generally been practiced. On the other hand, among the pipes, there are not only spirally corrugated pipes but also annually corrugated pipes. As such, there is naturally a large latent demand for using such annually corrugated pipes as pipes to be connected to the handholes or the like.

SUMMARY OF THE INVENTION

Accordingly, it is an object of the present invention to provide a bell mouth which is used for such an annularly corrugated pipe and is attached to the opening portion of the annularly corrugated pipe in such a manner as to be prevented from coming off in the same way as the compensating means based on the bell mouth for the opening portion of the conventionally existing spirally corrugated pipe, making it possible to compensate the connected state of the pipe.

The above-mentioned object can be attained by a bell mouth, according to the present invention, insertable in an opening portion of an annularly corrugated pipe made of small-diameter portions and large-diameter portions alternatively disposed each other in an axial direction thereof, in which the bell mouth includes a tubular portion insertable into the annularly corrugated pipe, a bell-shaped opening portion disposed at one end of the tubular portion, and a tubular opening portion communicated with an inner chamber of the annular corrugated pipe and disposed at the other end of the tubular portion, the bell mouth comprising:

a first projecting member radially projected from an outer peripheral surface of the tubular portion; and a second projecting member radially projected from the outer peripheral surface of the tubular portion and disposed at a position phased differently from the first projecting member both in an axial direction and in a circumferential direction, wherein each of the first and second projecting members has a sharply inclined surface inclined by a predetermined angle relative to the axis of the bell mouth and disposed on the bell-shaped opening portion side and also a gently inclined surface inclined relative to the axis by a given angle smaller than the predetermined angle and disposed on the tubular opening portion side, an axial phase interval (w) between a top portion of the first projecting member and a top portion of the second projecting member is not larger than an axial width (W) of an inner peripheral surface of the small-diameter portion, a circumferential phase angle (r) between the first projecting member and the second projecting member substantially equal to an angle which is calculated by dividing 180 degrees by a number of projections constituting the first projection member.

In the above-mentioned construction, the bell mouth for an annularly corrugated pipe according to the present invention, advantageously, the first projecting member comprises a pair of projections at locations which oppose each other in the circumferential direction of the tubular portion, and the second projecting member comprises a pair of projections at locations which are respectively offset from the projections of the first projecting member by phase angles of substantially 90 degrees in the circumferential direction.

In addition, in the above-mentioned construction, the bell mouth for an annularly corrugated pipe according to the present invention, advantageously, the first projecting member comprises three projections at a predetermined angular interval in the circumferential direction of the tubular portion, and the second projecting member comprises three projections at a given angular interval in the circumferential direction which are respectively offset from the projections of the first projecting member by phase angles of substantially 60 degrees in the circumferential direction.

Further, the above-mentioned construction, the bell mouth for an annularly corrugated pipe according to the present invention, advantageously, further comprises:

a third projecting member offset from the second projecting member in the axial direction and formed at a position of substantially the same phase angle as the first projecting member; and a fourth projecting member further offset from the third projecting member in the axial direction and formed at a position of substantially the same phase angle as the second projecting member.

Furthermore, in the above-mentioned construction, the bell mouth for an annularly corrugated pipe according to the present invention, advantageously, each of the third and fourth projecting members has a sharply inclined surface inclined by a predetermined angle relative to the axis of the bell mouth and disposed on the bell-shaped opening portion side and also a gently inclined surface inclined relative to the axis by a given angle smaller than the predetermined angle and disposed on the tubular opening portion side.

Moreover, in the above-mentioned construction, the bell mouth for an annularly corrugated pipe according to the present invention, advantageously, the third projecting member has a sharply inclined surface inclined by a predetermined angle relative to the axis of the bell mouth and disposed on the bell-shaped opening portion side and also a gently inclined surface inclined relative to the axis by a given angle smaller than the predetermined angle and disposed on the tubular opening portion side, and the fourth projecting member is formed into a cylindrical shape.

Still moreover, in the above-mentioned construction, the bell mouth for an annularly corrugated pipe according to the present invention, advantageously, at least one of the bell mouth and the annularly corrugated pipe is formed of synthetic resin and is formed elastically deformable in a radial direction.

In addition, the above-mentioned object can also be attained by a bell mouth, according to the present invention, which is used by being inserted in an opening portion of an annularly corrugated pipe used by being connected to a pipe connecting hole which is formed in a handhole or a manhole, wherein a tubular portion has on its outer peripheral surface one or a plurality of first projections projecting radially and one or a plurality of second projections projecting at a position phased differently from the first projection in an axial direction and in a circumferential direction, each of the projections being formed such that its surface on a bell-shaped opening portion side is formed as a sharply angled surface, while its surface on a tubular opening portion side is formed as a gently inclined surface, an axial phase interval (w) between the first projection and the second projection is set to an interval which satisfies a relationship: w≦W where (W) defines an axial width of an inner surface portion of a small-diameter portion in the annularly corrugated pipe, a circumferential phase angle (r) being set to a value calculated by dividing a substantially half angle of circumference (180 degrees) by the number of the first projections.

The present invention is arranged as described above, and in implementing the bell mouth, in a case where one first projection is formed at one location in the circumferential direction of the tubular portion, the circumferential phase angle r of the second projection with respect to the first projection is formed at a position phased at an angle calculated by dividing a substantially half angle of circumference (180 degrees) by the number of the first projections, i.e., at a position phased at a value calculated by dividing an angle of 180 degrees in the circumferential direction by one (1) which is the number of the first projection.

In a case where two first projections are formed projectingly at locations which oppose each other in the circumferential direction of the tubular portion, two second projections are formed projectingly at locations which are respectively offset from the first projections by phase angles of substantially 90 degrees in the circumferential direction.

In addition, in a case where three first projections are formed at locations which are respectively offset at phase angles of 120 degrees in the circumferential direction, three second projections are formed at positions where the circumferential phase angles r of the second projections with respect to the respective first projections are offset from the first projections by phase angles of substantially 60 degrees in the circumferential direction.

In addition, the projections are not confined to the aforementioned first projections and second projections, and may be implemented by providing third projections, fourth projections, and the like which are formed further offset in the axial direction of the tubular portion. In this case, the circumferential position of the third projection is formed at a position of substantially the same phase angle as the first projection, and the circumferential position of the fourth projection is formed at a position of substantially the same phase angle as the second projection.

Further, the fourth projections may be formed as small projections having short cylindrical shapes.

Furthermore, in the manufacture of the bell mouth in accordance with the present invention, the overall bell mouth is preferably formed integrally of a synthetic resin material. Generally, the annularly corrugated pipe P, i.e., an object to which the bell mouth is attached, is also formed of a synthetic resin material. In addition, a structure in which one or both of the bell mouth and the corrugated pipe are formed elastically deformable in a centripetal direction is preferable in that the press fitting and retention of the bell mouth with respect to the pipe can be effected positively.

DETAILED DESCRIPTION OF THE PREFERRED EMBODIMENTS

Figure 1:
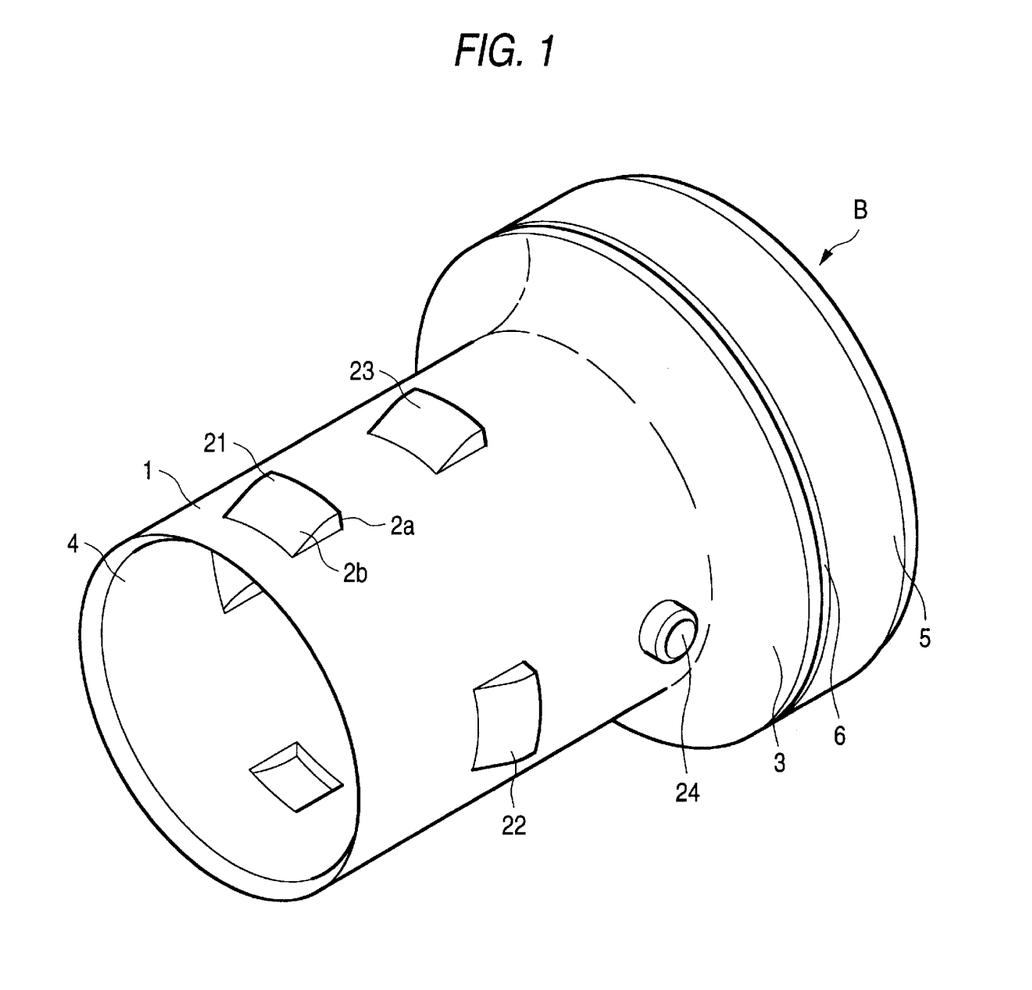
FIG. 1 is a perspective view illustrating a first embodiment of the present invention.
Figure 2:
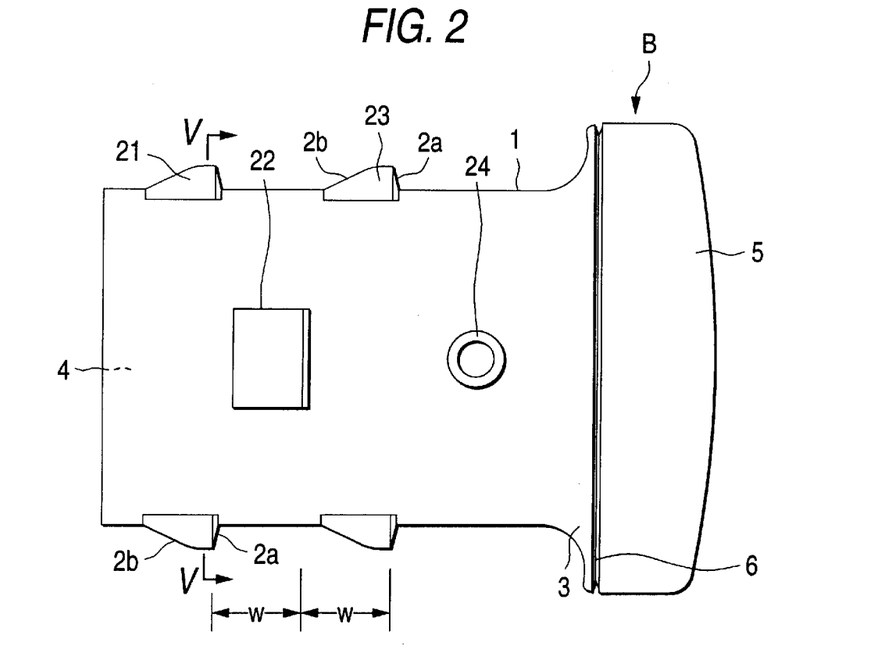
FIG. 2 is a front elevational view of the bell mouth shown in FIG. 1.
Figure 3:
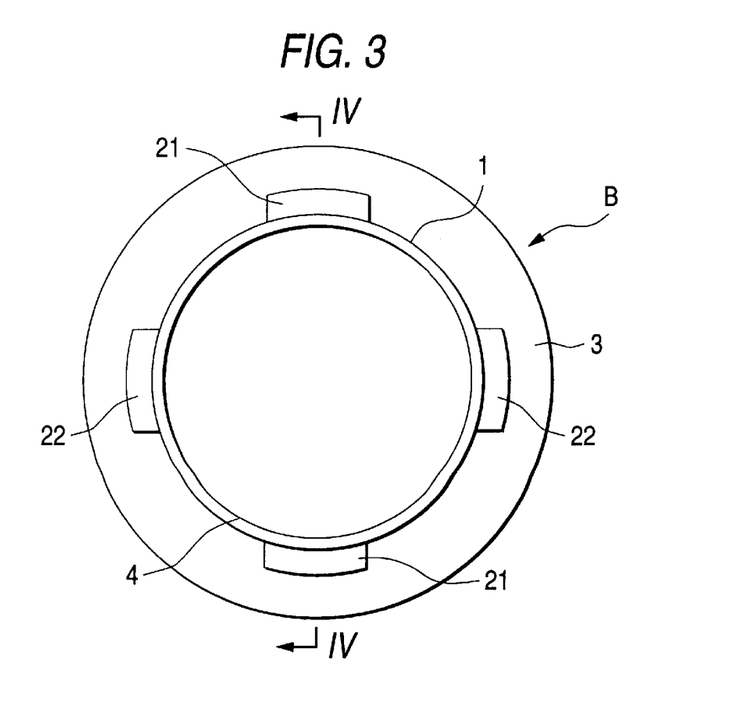
FIG. 3 is a left side elevational view of FIG. 2.
Figure 4:
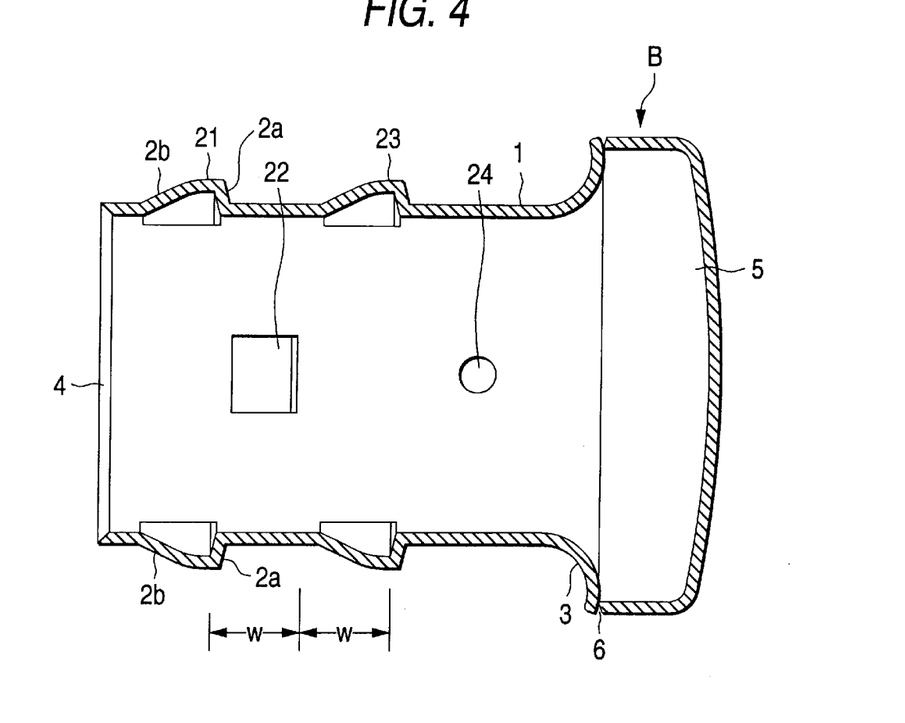
FIG. 4 is a cross-sectional view taken along line IV—IV in FIG. 3.
Figure 5:
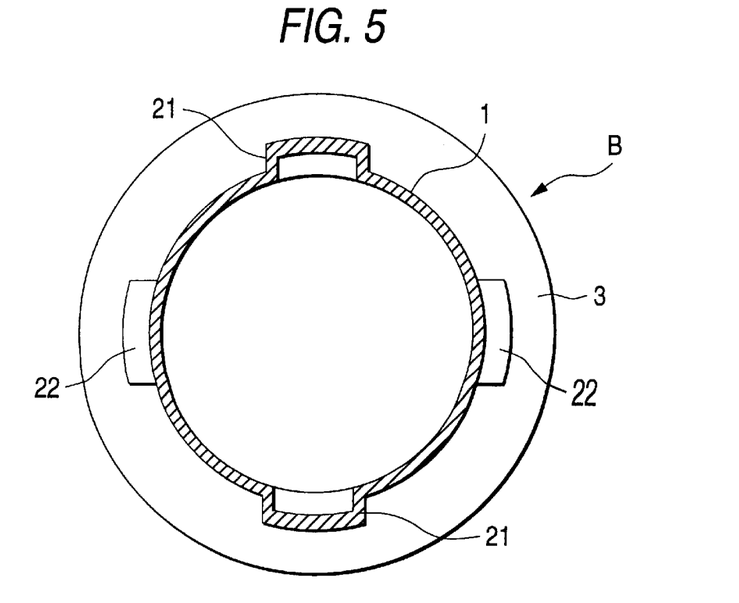
FIG. 5 is a cross-sectional view taken along line V—V in FIG. 2.

Referring now to the drawings, a description will be given of the embodiments of the present invention. Of the drawings, FIGS. 1 to 5 illustrate a first embodiment of a bell mouth in accordance with the present invention, in which FIG. 1 is a perspective view illustrating an overall configuration, FIG. 2 shows a front elevational shape thereof, FIG. 3 shows a side elevational shape on a hollow cylindrical opening portion side thereof, FIG. 4 shows a cross-sectional shape along the section-indicating line in FIG. 3, and FIG. 5 shows a cross-sectional shape along the section-indicating line in FIG. 2.

Figure 9:
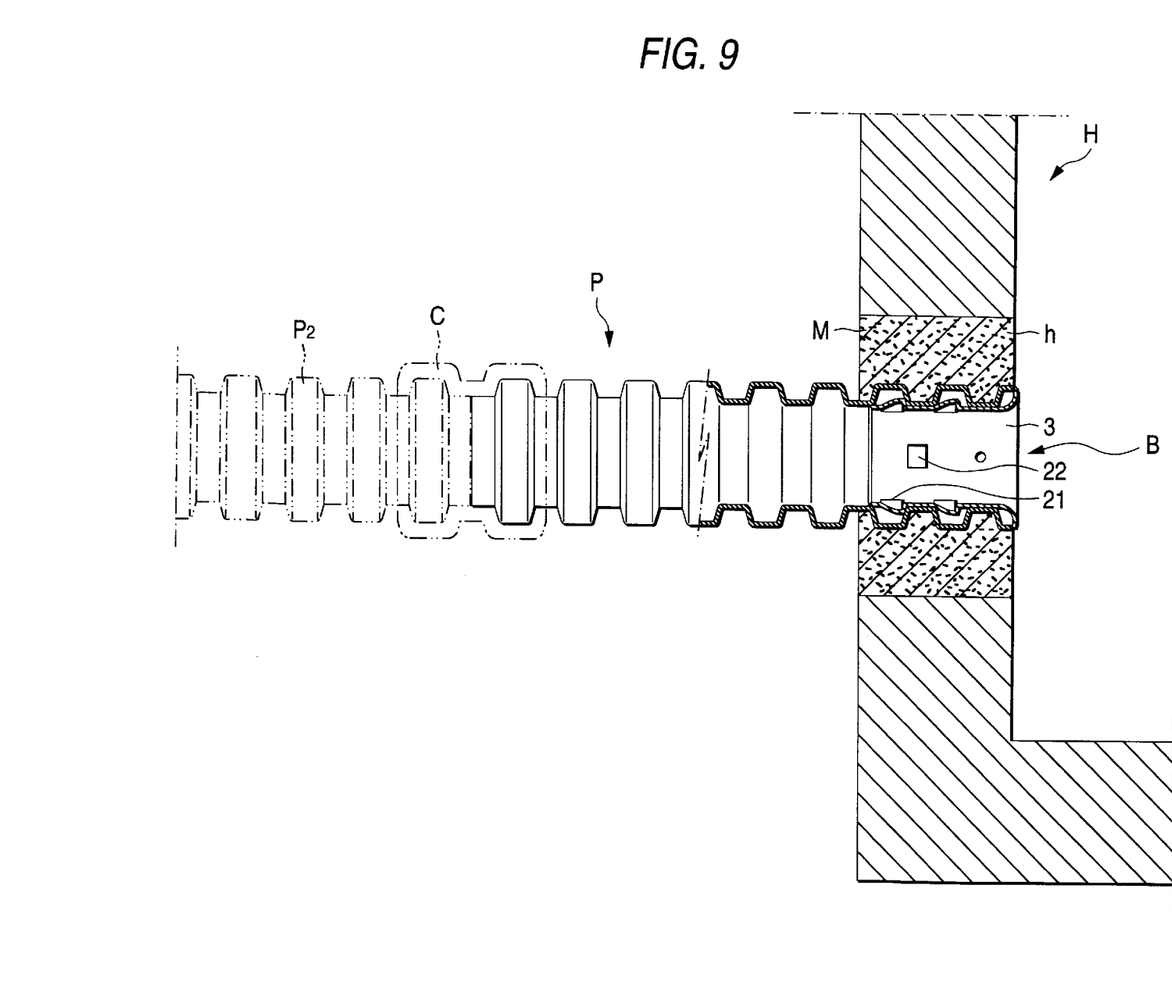
FIG. 9 is a partially vertical cross-sectional view illustrating the state of use.

A bell mouth B in accordance with the present invention is used by being inserted in an opening portion 31 of an annularly corrugated pipe P whose opening end portion is coupled to a pipe connecting hole h formed in a handhole or manhole H, as shown in FIG. 9 to which reference will be made later.

The overall bell mouth B shown in this embodiment is integrally molded by a blow molding means by using a synthetic resin material which, though excelling in pressure deformation resistance after molding, is elastically deformable, and which suffers small deterioration with time, is economical, and easily available, e.g., polyvinyl chloride or a polyolefin-based resin represented by such as polyethylene and polypropylene.

The bell mouth B in terms of its structure has as its principal portion a tubular portion 1 whose one end side (the left-hand side in FIG. 1) is formed as a tubular opening portion 4, and whose opposite end side is formed as a bell-shaped opening portion 3 which is flared. The illustrated bell mouth B has a shape in which a dust-proof cap 5 is integrally coupled to the outer side of the bell-shaped opening portion 3 via a notched groove 6 for cutting.

A pair of first projections 21, a pair of second projections 22, a pair of third projections 23, and a pair of fourth projections 24 are respectively formed projectingly on the outer peripheral surface of the tubular portion 1, these pairs of projections being arranged in that order at predetermined intervals beginning with the pair located closest to the tubular opening portion 4. The two projections in each of these pairs are respectively formed at positions displaced 180 degrees in the circumferential direction. Further, an axial interval between the top portions of adjacent ones of these pairs is set to an interval w corresponding to an interval ranging from about one half of to substantially the same width as an axial width W (see FIG. 6) of an inner surface portion of a small-diameter portion 32 in the annularly corrugated pipe P for which the bell mouth is used. Further, the projections in the respective pairs, such as the first projections 21 and the second projections 22, as well as the second projections 22 and the third projections 23, are respectively displaced circumferentially an angle of 90 degrees (a phase angle r in the circumferential direction) with respect to the projections of an adjacent pair. Therefore, the first projections 21 and the third projections 23, as well as the second projections 22 and the fourth projections 24, are respectively disposed on the same lines of angles of circumference.

The circumferential phase angle r between the projection in each of these pairs and the projection in another pair adjacent thereto is set to a value calculated by dividing a substantially one-half angle of circumference by the number of projections in each pair. Meanwhile, the axial phase interval w between the projection in each pair and the projection in a pair adjacent thereto is set to an interval which satisfies the relationship: $w \leq W$ with respect to the axial width W of the inner surface portion of the small-diameter portion 32 in the annularly corrugated pipe P for which the bell mouth is used.

The shape of each of the individual projections 21, 22, and 23 is form ed as a scalene triangle-shaped projection in a side view in which its surface on the bell-shaped opening portion 3 side is formed as a sharply angled surface 2a which rises up at a sharp angle, while its surface on the tubular opening portion 4 side is formed as a gently inclined surface 2b which is inclined gently. Thus each of the projections 21, 22, and 23 is formed so as to keep a strong resisting force against a force acting toward the tubular opening portion 4. Meanwhile, the fourth projections 24 shown in this embodiment are formed as small projections having short cylindrical shapes.

Figure 6:
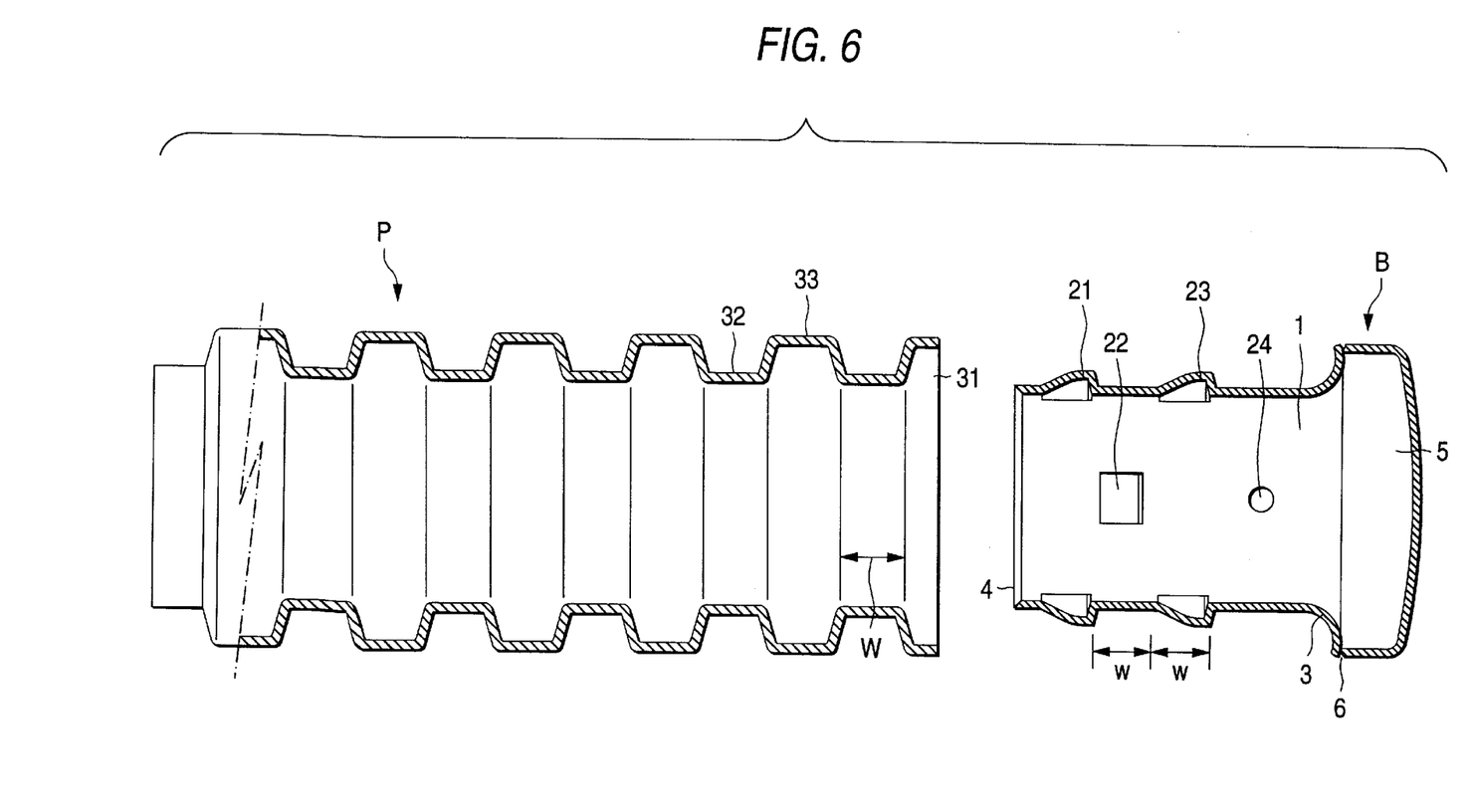
FIG. 6 is a vertical cross-sectional view illustrating the relationship between the bell mouth and the pipe.
Figure 7:
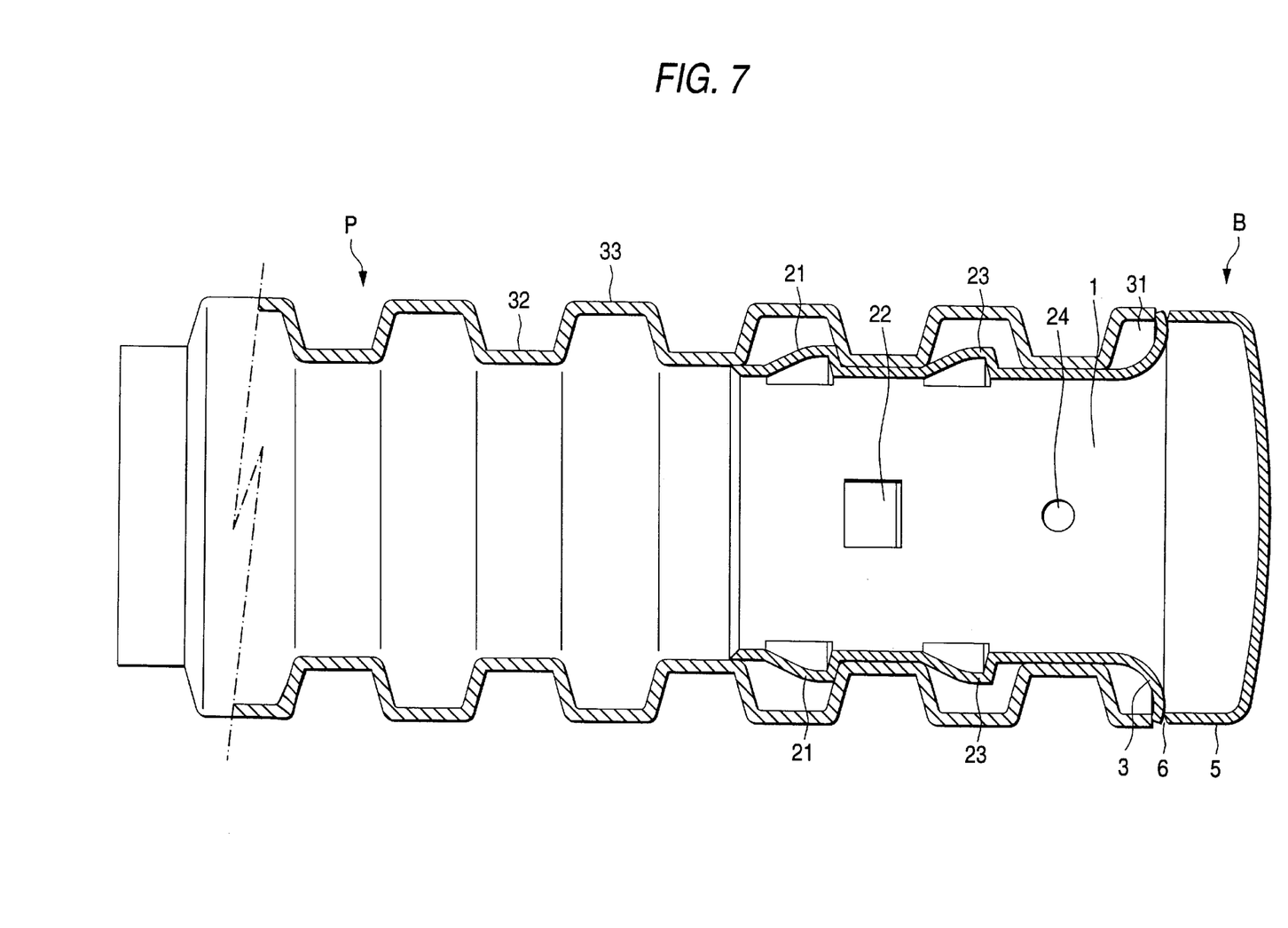
FIG. 7 is a vertical cross-sectional view illustrating the state in which the bell mouth is inserted in the pipe.
Figure 8:
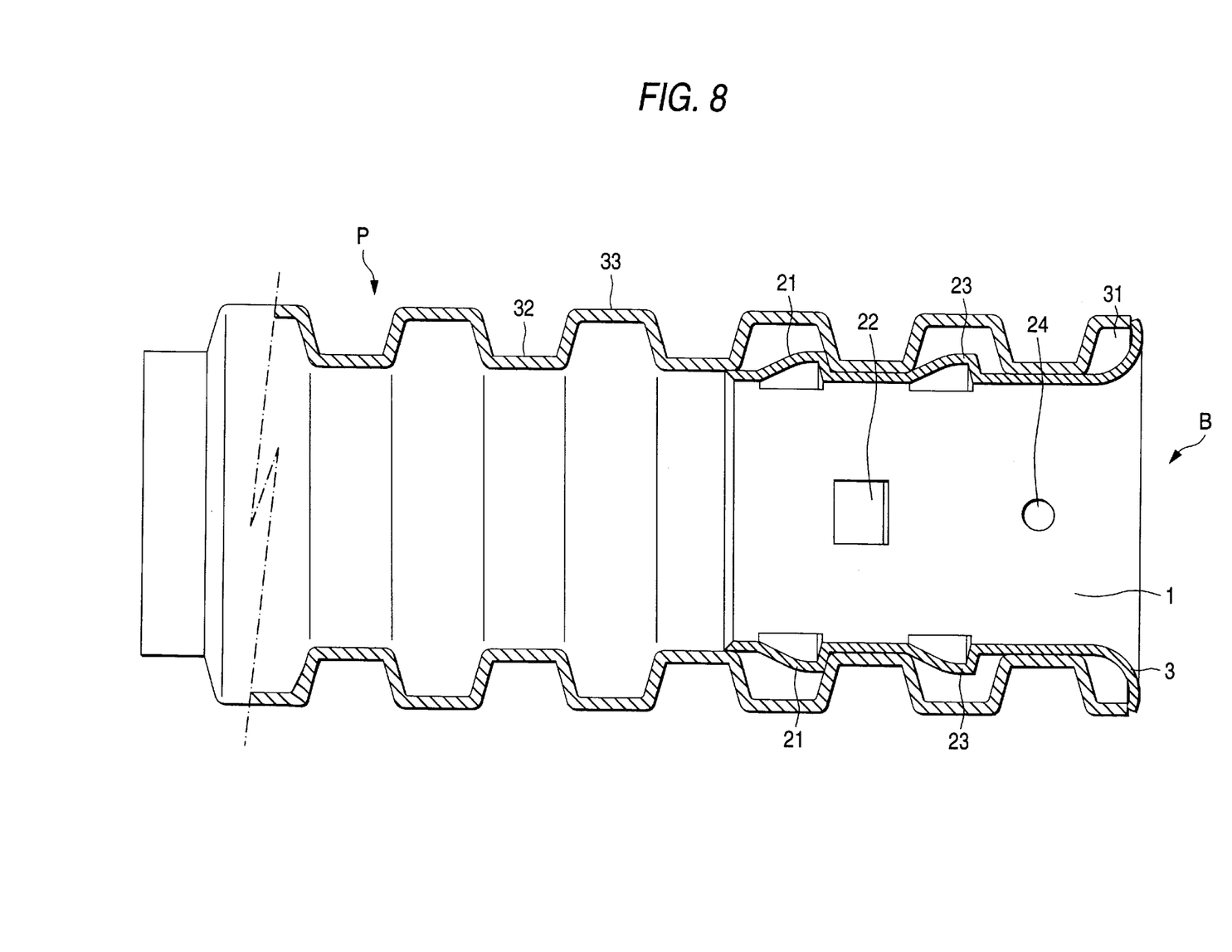
FIG. 8 is a vertical cross-sectional view similar to FIG. 7 but with a cap portion removed.

As the means for attaching the bell mouth B to the pipe is shown in FIGS. 6 to 8, the bell mouth B formed in the above-described manner is press fitted into the interior of the pipe P from its opening portion 31 with the tubular opening portion 4 side set as a distal end, the pipe P being used by being coupled to the pipe connecting hole h in the handhole or manhole H used as a junction point for electric cables or telephone cables, the pipe wall being formed in the annular corrugated shape. The bell mouth B is inserted until the rear surface of the bell-shaped opening 3 of the bell mouth B abuts against the opening portion 31 of the pipe P, as shown in FIG. 7.

As for the bell mouth B thus attached to the pipe end, the dust-proof cap 5 which is integrally coupled to one end thereof serves to prevent dust, earth and sand, and the like from entering the interior of the pipe. Accordingly, after the bell mouth B is attached to the pipe P, the bell mouth B is used in the state in which the cap 5 is removed by being cut off at the notched groove 6 for cutting at the time of wiring in the pipe, as shown in FIG. 7. However, such as in a case where the wiring in the pipe P is effected simultaneously with piping, the dust-proof cap 5 may be removed by cutting before attachment to the pipe P. Furthermore, the bell mouth B in accordance with the present invention may be formed in a shape in which this dust-proof cap 5 is not provided from the beginning of manufacture.

Figure 12:
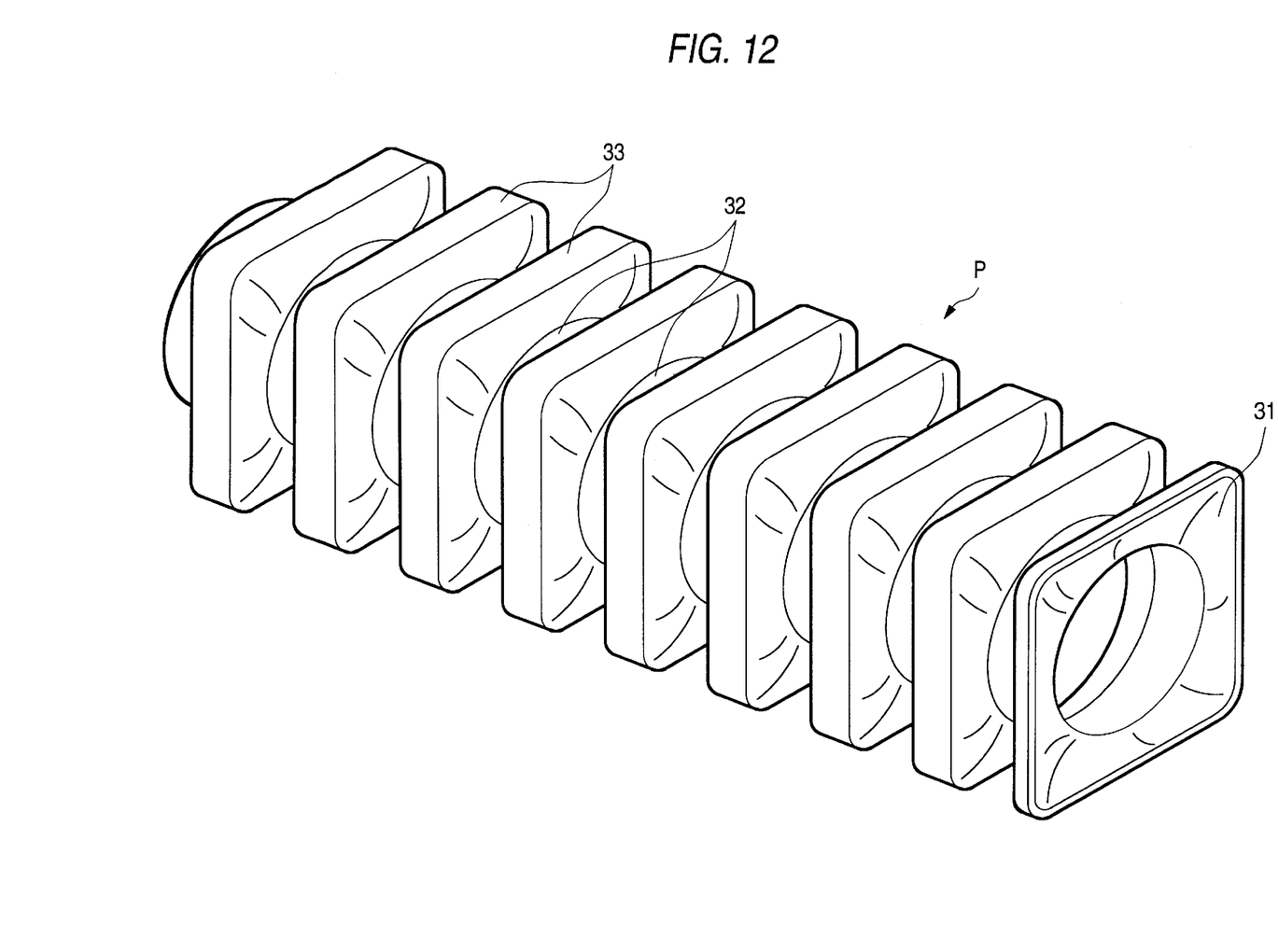
FIG. 12 is a perspective view of a pipe.
Figure 13:
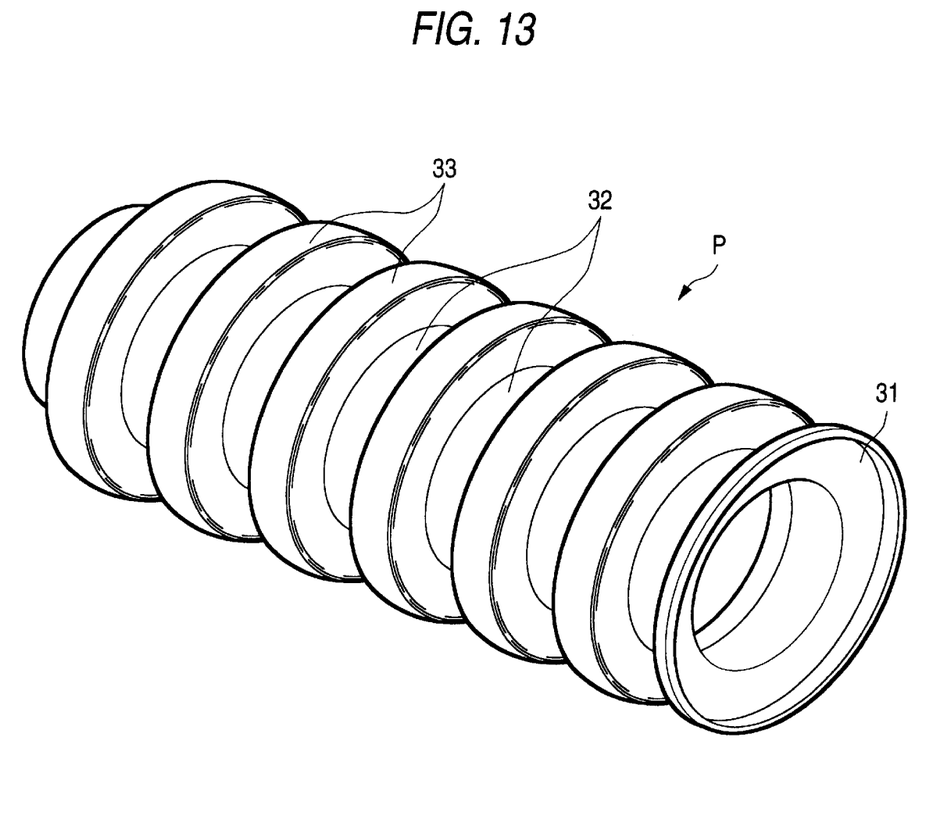
FIG. 13 is a perspective view of another pipe.

Further, the pipe P referred to herein is used by being connected and fixed in a state in which it is made open on the inner surface side of the pipe connecting hole h in the handhole or manhole H used as a junction point for electric cables or telephone cables, as the state of use is shown in FIG. 9. This pipe P includes two types, i.e., a pipe in which, as shown in FIG. 12, large-diameter portions 33 each having a substantially square cross section and the small-diameter portions 32 each having a substantially round cross section are alternately arranged in the axial direction of the pipe, and a pipe in which, as shown in FIG. 13, the large-diameter portions 33 each having a substantially round large-diameter cross section and the small-diameter portions 32 each having a substantially round small-diameter cross section are alternately arranged in the axial direction of the pipe.

The bell mouth is used by being attached to the opening portion 31 of the pipe P for use as a conduit line. In the state in which the pipe P is disposed in the pipe connecting hole h of the handhole H, a filling and hardening material M such as cement mortar is filled between an outer peripheral surface of the pipe P and an inner peripheral surface of the pipe connecting hole h of the handhole H. As the filled hardening material M is allowed to harden, the pipe P is secured watertightly to the handhole H.

In terms of the length of the pipe P itself, the pipe P may be an elongated one, or one which is cut into appropriate lengths. As shown by the phantom lines in FIG. 9, a separate pipeline P2 is laid in the direction of extension of the pipe P, the two pipes are coupled by a connection joint C, and a series of conduit lines is formed up to a next handhole.

Figure 10:
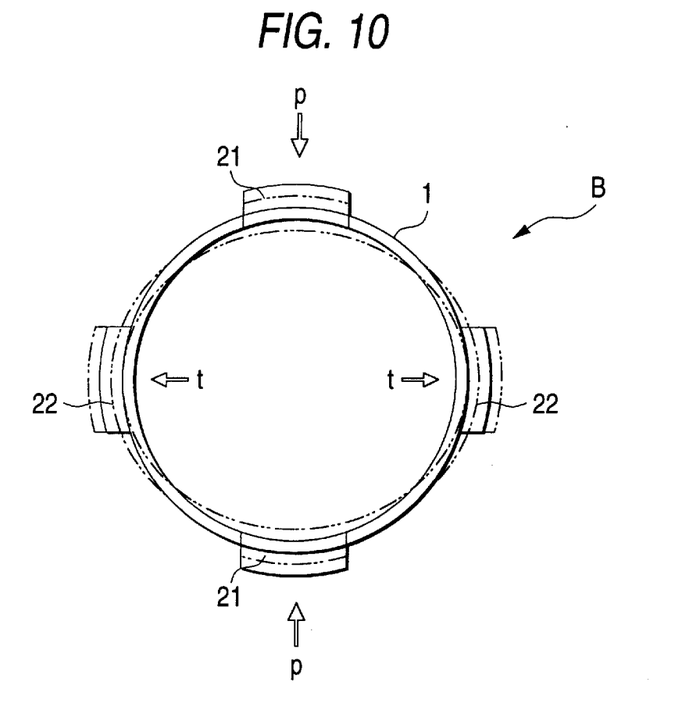
FIG. 10 is a diagram for explaining the state of compressive deformation.

Next, a description will be given of the relationship between the pipe P and the elastic deformation of the bell mouth B shown in FIGS. 10 and 11. The tubular portion 1 of the bell mouth B normally maintains a substantially round shape, as shown by the solid lines in FIG. 10. When this bell mouth B is press fitted into the pipe P, the projections (the upper and lower projections 21 in the drawing) abut against the small-diameter portion 32 of the pipe P and are hence subjected to pressure in the vertical direction (in the directions of arrows p, p), thereby undergoing elastic deformation in the vertical direction while concurrently undergoing expansive deformation in the horizontal direction (in the directions of arrows t, t) before passing the small-diameter portion 32 of the pipe P. At this time, in a case where the pipe P is also elastically deformable, the protrusions pass while expanding and deforming the small-diameter portion 32 of the pipe P in the vertical direction.

Figure 11:
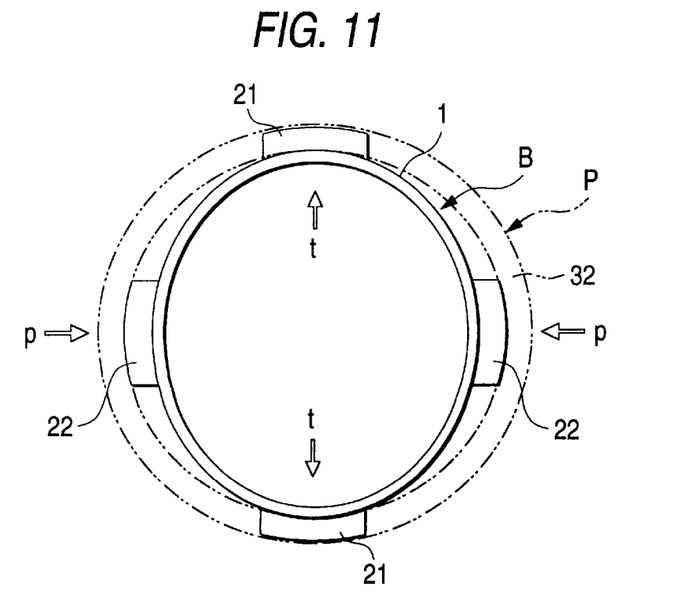
FIG. 11 is a diagram for explaining the state of insertion into the pipe.

As shown in FIG. 11, after the vertically projecting first projections 21 passed the small-diameter portion 32 of the pipe, the second projections 22 in an ensuing position subsequently abut against the same small-diameter portion 32 in the horizontal direction and are hence subjected to pressure in the horizontal direction, thereby undergoing contractive deformation in that direction while concurrently undergoing expansive deformation in the vertical direction. At this time, the small-diameter portion 32 of the pipe P receives pressure from the second projections 22 and undergo slight expansive deformation in the horizontal direction while concurrently undergoing slight contractive deformation in the vertical direction.

If the press fitting of the bell mouth B into the pipe P is stopped in this state, the first projections 21 which first passed the small-diameter portion 32 resume their original positions. Further, because the first projections 21 are displaced in the vertical direction even slightly due to the abutment of the second projections 22 against the small-diameter portion 32 of the pipe P, and because the small-diameter portion 32 of the pipe P is contractively deformed in the vertical direction by the abutment by the second projections 22, the first projections 21 positively abut against the side surface of the small-diameter portion 32, thereby making it possible to reliably prevent the bell mouth B from coming off the pipe P.

Figure 14:
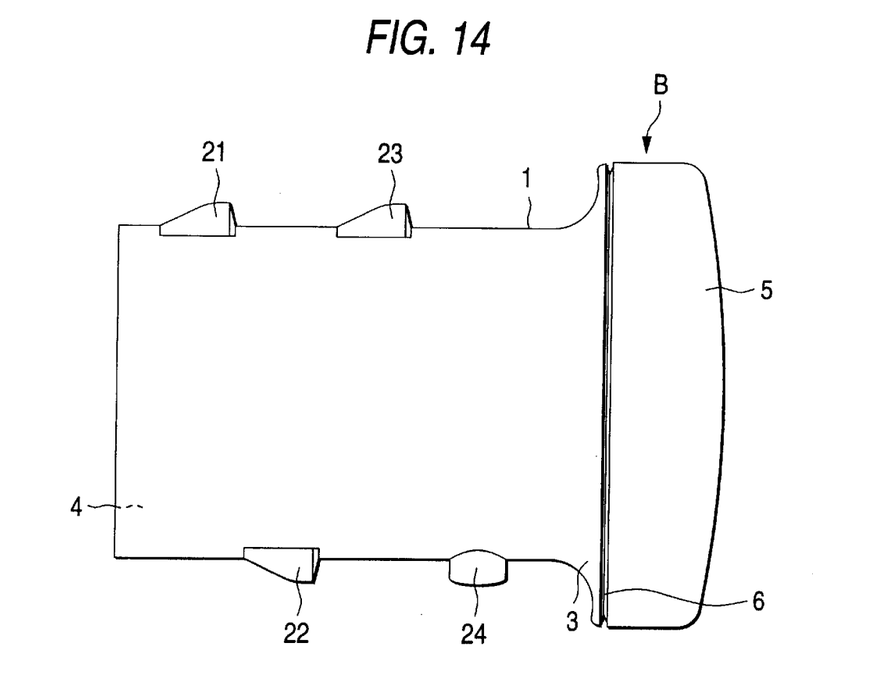
FIG. 14 is a front elevational view of a bell mouth illustrating another embodiment.
Figure 15:
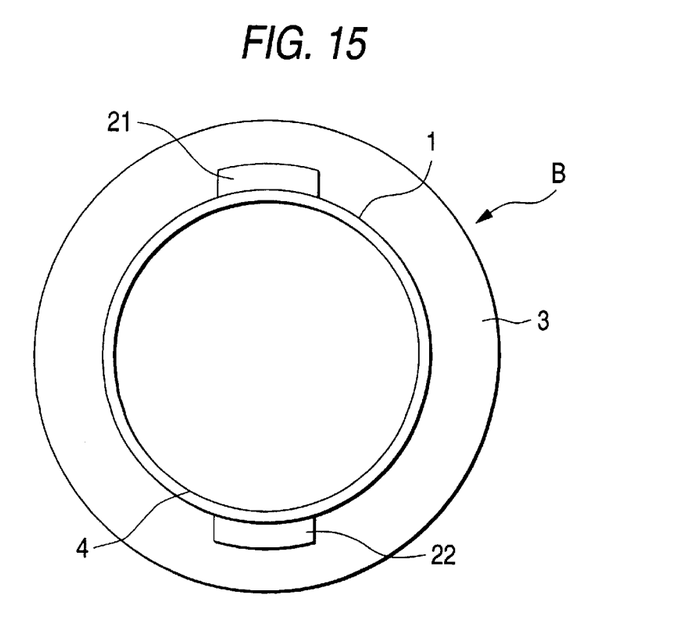
FIG. 15 is a left side elevational view of FIG. 14.
Figure 16:
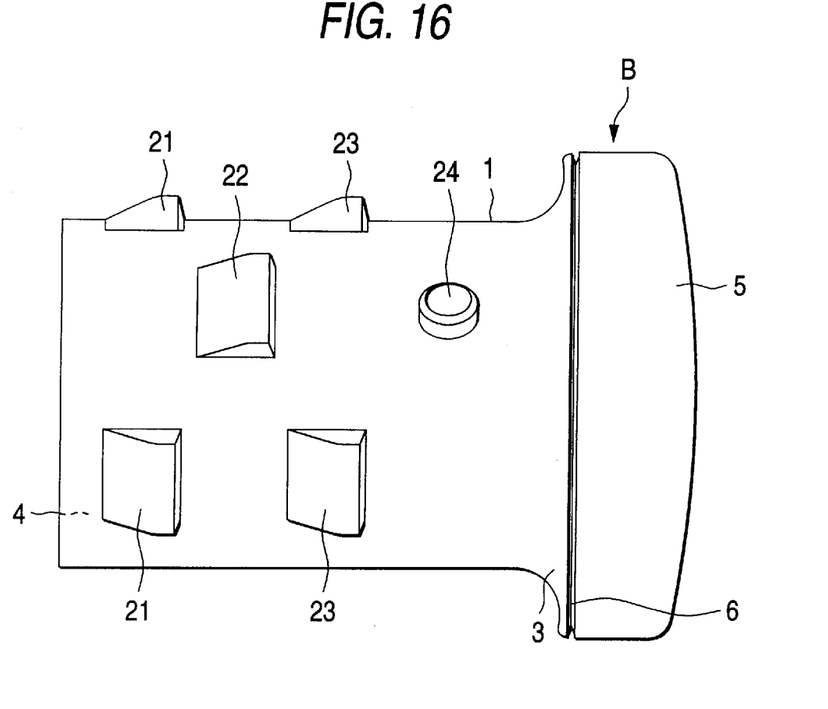
FIG. 16 is a front elevational view of a bell mouth illustrating still another embodiment.
Figure 17:
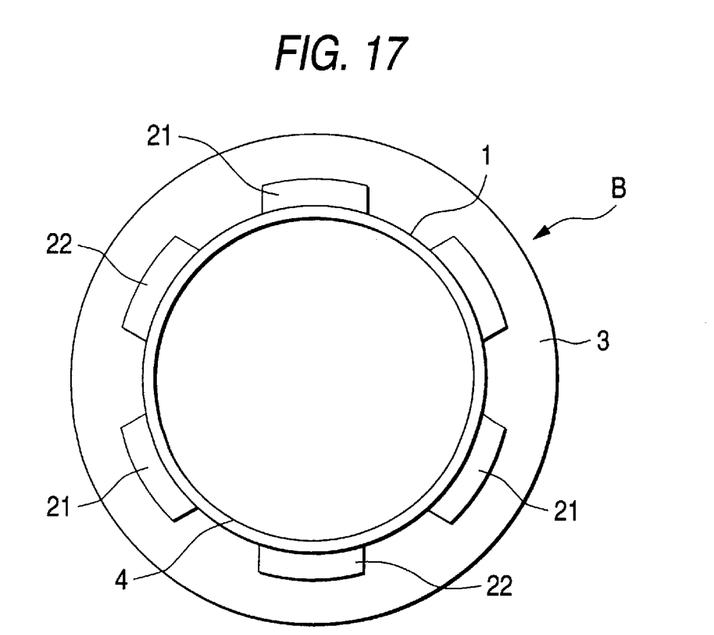
FIG. 17 is a left side elevational view of FIG. 16.

FIGS. 14 and 15 show another embodiment of the bell mouth B, in which the first projection 21 is disposed at an upper position on the tubular portion 1, and the second projection 22 is disposed at a lower position on the tubular portion 1, the structure being such that all of these first to fourth projections 21 to 24 are formed one by one in the circumferential direction of the tubular portion 1. FIGS. 16 and 17 show still another embodiment of the bell mouth B, which is structured such that all of these first to fourth projections 21 to 24 are respectively formed in threes in the circumferential direction of the tubular portion 1.

Although a description has been given of the embodiments which are considered as representative of the present invention, the present invention is not necessarily limited to the structures of these embodiments, and may be implemented by being modified as required within the scope in which the above-described constituent requirements of the present invention are provided, the object of the present invention can be attained, and the advantages which are described below can be exhibited.

As is apparent from the above description, the bell mouth in accordance with the present invention is used for a pipe which is not spirally corrugated but annularly corrugated in terms of the shape of the pipe wall, and the bell mouth makes it possible for such a pipe to be used as a protective pipe for electric cables and the like by being connected to the handhole or manhole. Accordingly, an advantage is offered in that the bell mouth in accordance with the present invention can be attached to the opening portion of an annularly corrugated pipe which has not been used conventionally, making it possible to compensate the connected state of the pipe.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A bell mouth insertable in an opening portion (31) of an annularly corrugated pipe (P) made of small- diameter portions and large-diameter portions alternatively disposed to each other in an axial direction thereof, in which said bell mouth includes a tubular portion (1) insertable into said annularly corrugated pipe, a bell-shaped opening portion disposed at one end of said tubular portion, and a tubular opening portion (4) communicated with an inner chamber of said annular corrugated pipe and disposed at the other end of said tubular portion, said bell mouth comprising:

a first projecting member (21) radially projected from an outer peripheral surface of said tubular portion; and a second projecting member (22) radially projected from the outer peripheral surface of said tubular portion and disposed at a position phased differently from said first projecting member (21) both in an axial direction and in a circumferential direction, wherein each of said first and second projecting members (21 and 22) has a sharply inclined surface (2a) inclined by a predetermined angle relative to the axis of the bell mouth and disposed on the bell-shaped opening portion (3) side and also a gently inclined surface (2b) inclined relative to said axis by a given angle smaller than said predetermined angle and disposed on the tubular opening portion (4) side, an axial phase interval (w) between a top portion of said first projecting member (21) and a top portion of said second projecting member (22) is not larger than an axial width (W) of an inner peripheral surface of the small-diameter portion (32), and a circumferential phase angle (r) between said first projecting member (21) and said second projecting member (22) substantially equal to an angle which is calculated by dividing 180 degrees by a number of projections constituting said first projection member (21).

2. The bell mouth for an annularly corrugated pipe according to claim 1, wherein said first projecting member (21) comprises a pair of projections (21, 21) at locations which oppose each other in the circumferential direction of said tubular portion (1), and said second projecting member (22) comprises a pair of projections (22, 22) at locations which are respectively offset from the projections (21, 21) of said first projecting member (21) by phase angles of substantially 90 degrees in the circumferential direction.

3. The bell mouth for an annularly corrugated pipe according to claim 1, wherein said first projecting member (21) comprises three projections (21, 21, 21) at a predetermined angular interval in the circumferential direction of said tubular portion (1), and said second projecting member (22) comprises three projections (22, 22, 22) at a given angular interval in the circumferential direction which are respectively offset from the projections (21, 21, 21) of said first projecting member (21) by phase angles of substantially 60 degrees in the circumferential direction.

4. The bell mouth for an annularly corrugated pipe according to claim 1, further comprising:
  a third projecting member (23) offset from said second projecting member (22) in the axial direction and formed at a position of substantially the same phase angle as the first projecting member (21); and
  a fourth projecting member (24) further offset from said third projecting member (23) in the axial direction and formed at a position of substantially the same phase angle as the second projecting member (22).

5. The bell mouth for an annularly corrugated pipe according to claim 4, wherein each of the third and fourth projecting members (23 and 24) has a sharply inclined surface (2a) inclined by a predetermined angle relative to the axis of the bell mouth and disposed on the bell-shaped opening portion (3) side and also a gently inclined surface (2b) inclined relative to the axis by a given angle smaller than the predetermined angle and disposed on the tubular opening portion (4) side.

6. The bell mouth for an annularly corrugated pipe according to claim 4, wherein said third projecting member (23) has a sharply inclined surface (2a) inclined by a predetermined angle relative to the axis of the bell mouth and disposed on the bell-shaped opening portion (3) side and also a gently inclined surface (2b) inclined relative to the axis by a given angle smaller than the predetermined angle and disposed on the tubular opening portion (4) side, and said fourth projecting member (24) is formed into a cylindrical shape.

7. The bell mouth for an annularly corrugated pipe according to claim 1, wherein at least one of the bell mouth and the annularly corrugated pipe (P) is formed of synthetic resin and is formed elastically deformable in a radial direction.

* * * * *